(12) United States Patent
Elshaer (10) Patent No.: US 12,424,941 B2
(45) Date of Patent: Sep. 23, 2025

(54) MATRIX TRANSFORMER STRUCTURE AND CIRCUIT TOPOLOGY FOR MAGNETICALLY INTEGRATED ONBOARD CHARGER AND HIGH VOLTAGE/LOW VOLTAGE DC/DC CONVERTER

(71) Applicant: FORD GLOBAL TECHNOLOGIES, LLC, Dearborn, MI (US)

(72) Inventor: Mohamed Elshaer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 54 days.

(21) Appl. No.: 18/485,343

(22) Filed: Oct. 12, 2023

(65) Prior Publication Data

US 2025/0125729 A1 Apr. 17, 2025

(51) Int. Cl.
*H02M 3/335* (2006.01)
*B60L 53/22* (2019.01)
*H01F 27/24* (2006.01)
*H01F 27/28* (2006.01)
*H02M 1/44* (2007.01)

(52) U.S. Cl.
CPC ............ *H02M 3/335* (2013.01); *B60L 53/22* (2019.02); *H01F 27/24* (2013.01); *H01F 27/28* (2013.01); *B60L 2210/10* (2013.01); *H02M 1/44* (2013.01)

(58) Field of Classification Search
CPC .................................................... H02M 3/335
USPC ......................................................... 307/10.1
See application file for complete search history.

(56) References Cited

U.S. PATENT DOCUMENTS

| 5,093,646 | A | * | 3/1992 | Herbert | ............... H01F 19/04 323/361 |
| 9,931,951 | B2 | | 4/2018 | Khaligh et al. | |
| 10,696,182 | B2 | | 6/2020 | Khaligh et al. | |
| 11,491,883 | B2 | | 11/2022 | Khaligh et al. | |
| 2017/0282747 | A1 | | 10/2017 | Wang | |
| 2022/0045628 | A1 | * | 2/2022 | Chen | ................. H02J 7/0016 |
| 2022/0321016 | A1 | | 10/2022 | Khaligh et al. | |

FOREIGN PATENT DOCUMENTS

JP 2020527321 A 9/2020
KR 20210050555 A 5/2021

* cited by examiner

*Primary Examiner* — Joseph Chang
(74) *Attorney, Agent, or Firm* — David B. Kelley; Brooks Kushman P.C.

(57) ABSTRACT

An automotive power system has, among other things, a matrix transformer structure, including five windings and two separate cores, shared between and magnetically coupling a first isolated DC/DC converter arranged to directly exchange power with a traction battery and a second isolated DC/DC converter arranged to directly exchange power with a bus.

17 Claims, 5 Drawing Sheets

MATRIX TRANSFORMER STRUCTURE AND CIRCUIT TOPOLOGY FOR MAGNETICALLY INTEGRATED ONBOARD CHARGER AND HIGH VOLTAGE/LOW VOLTAGE DC/DC CONVERTER

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store the electrical energy.

SUMMARY

An automotive power system includes a first isolated DC/DC converter arranged to directly exchange power with a traction battery, a second isolated DC/DC converter arranged to directly exchange power with a bus, and a matrix transformer structure, including five windings and two separate cores, shared between and magnetically coupling the first and second isolated DC/DC converters.

A vehicle includes a bidirectional totem pole power factor correction circuit, a traction battery, an isolated DC/DC converter connected between the bidirectional totem pole power factor correction circuit and traction battery such that power from an AC source feeding the bidirectional totem pole power factor correction circuit charges the traction battery, a second isolated DC/DC converter, and a matrix transformer structure, including five windings and two separate cores, shared between and magnetically coupling the first and second isolated DC/DC converters.

An automotive power system includes a matrix transformer structure, including five windings and two separate cores, shared between and magnetically coupling first and second isolated DC/DC converters. A first of the windings is wound around both of the cores and partially defines the first isolated DC/DC converter. A second and third of the windings are each wound around a different one of the cores and partially define the first isolated DC/DC converter. A fourth of the windings is wound around a same one of the cores as the second of the windings, partially defines the second isolated DC/DC converter, and is magnetically coupled with the first and second of the windings such that current through the second of the windings induces voltages across the first and fourth of the windings.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery current control modules (BCCMs) are components in automotive vehicles, particularly those with electric or hybrid powertrains. These modules play a role in managing the flow of electric current to and from the battery.

BCCMs function as control units that interface between the battery, the charging system, and the electrical loads. They monitor and control various parameters such as battery state of charge, voltage, and temperature, and based on this information, they manage the flow of current to the battery.

BCCMs may facilitate charging control by overseeing the charging process of the battery, and managing the voltage and current supplied by the charging system. By monitoring the battery's state of charge and adjusting the charging parameters accordingly, BCCMs attempt to ensure the battery receives the appropriate level of charge to maintain performance.

Similarly, BCCMs may be responsible for discharging control. They can manage the current output from the battery to the electrical loads in the vehicle. By controlling the current flow, BCCMs may ensure a controlled supply of power to the various electrical components and systems.

BCCMs may also implement various measures for the battery. For instance, they may monitor battery temperature to prevent overheating. They may also detect overvoltage or undervoltage situations and implement measures to preclude short circuits or excessive current draw.

Communication interfaces are often incorporated into BCCMs. These interfaces, such as Controller Area Network (CAN) or LIN (Local Interconnect Network), allow BCCMs to exchange information with other vehicle systems, including the engine control unit (ECU) or the body control module (BCM). This enables coordinated operation and integrated control across various vehicle functions. BCCMs can receive commands or instructions from other control units and adjust current flow accordingly.

BCCMs may feature diagnostic capabilities. These modules can monitor the health and performance of the battery system. They can log codes and provide diagnostic information, facilitating maintenance.

Inverter system controllers (ISCs) are also components in automotive vehicles with electric powertrains. They play a role in managing and controlling the power flow between the battery and electric motor. A function of an inverter system controller is to convert direct current (DC) from the battery into alternating current (AC) to power the electric motor.

ISCs may act as a decision maker for the power electronics system. It may monitor various parameters such as motor speed, torque, and temperature to ensure operation.

A task of ISCs is to convert DC power from the battery into three-phase AC power suitable for the electric motor. It may utilize high-power semiconductor devices, for example insulated-gate bipolar transistors (IGBTs), to control the switching of current and voltage. By modulating the pulse width and frequency of the AC waveform, the inverter system controller manages the speed and torque output of the electric motor.

ISCs may provide control over the electric motor. They may use algorithms and control strategies to manage motor speed, torque, and direction of rotation. By adjusting the switching patterns of the IGBTs, the controller can vary the frequency and amplitude of the AC waveform, altering motor operation.

ISCs can facilitate regenerative braking. During slowing or braking, the electric motor operates as a generator, converting the vehicle's kinetic energy into electrical energy. The inverter system controller may control the flow of energy, directing it back to the battery for storage.

ISCs may be responsible for managing the thermal conditions of the power electronics system. They may monitor the temperature of the inverter and electric motor, and employ cooling systems such as fans, liquid cooling, or heat sinks to dissipate excess heat and maintain operating temperatures.

ISCs may incorporate diagnostic capabilities to detect and protect against faults in the power electronics system. They may monitor various parameters such as voltage, current, and temperature values that could indicate a potential fault. If a fault is detected, the controller may take corrective actions such as shutting down the system, activating other measures, or providing fault codes for diagnostic purposes.

ISCs often feature communication interfaces such as CAN or Ethernet, enabling integration with other vehicle systems. They may exchange information with the main control unit, enabling coordinated operation and facilitating diagnostics and troubleshooting. Communication interfaces also allow the controller to receive commands or instructions from the electronic control unit (ECU) and adjust the power output accordingly.

ISCs may incorporate features such as overvoltage and undervoltage monitoring, overcurrent monitoring, and isolation monitoring.

Integrating the BCCM with the ISC is conventionally considered a challenge due to the disconnecting circuitry. The schematics of typical separate systems 10, 12 are shown in FIGS. 1 and 2, respectively.

Figure 1:
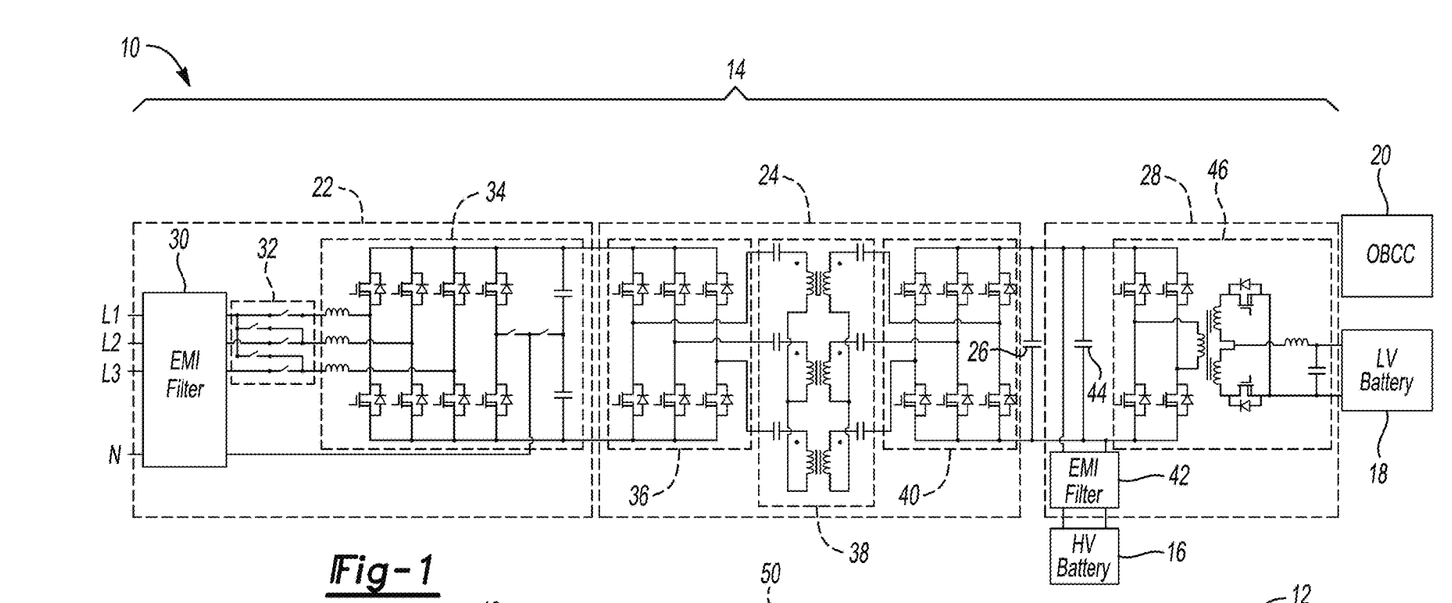
FIG. 1 is a schematic diagram of a system including a battery current control module.
Figure 2:
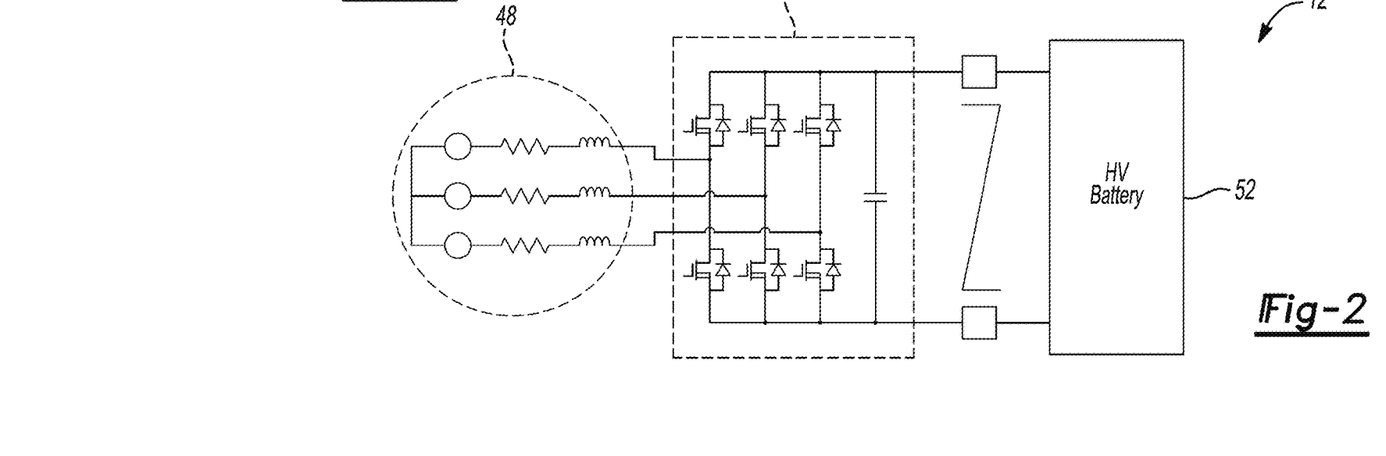
FIG. 2 is a schematic diagram of a system including an inverter system controller.

Referring to FIG. 1, the system 10 includes a BCCM 14, a traction battery 16, an auxiliary battery 18, and an onboard charge controller 20. The BCCM includes an AC/DC power factor correction circuit 22, an isolated high voltage DC/DC circuit 24, a link capacitor 26, and an isolated high voltage to low voltage DC/DC circuit 28. The isolated high voltage DC/DC circuit 24 is connected between the AC/DC power factor correction circuit 22 and link capacitor 26. The link capacitor 26 is connected between the isolated high voltage DC/DC circuit 24 and the isolated high voltage to low voltage DC/DC circuit 28. The traction battery 16 and auxiliary battery 18 are connected with the isolated high voltage to low voltage DC/DC circuit 28.

The AC/DC power factor correction circuit 22 includes an electromagnetic interference filter 30, a switch bank 32, and AC/DC power converter circuitry 34. The switch bank 32 is connected between the electromagnetic interference filter 30 and AC/DC power converter circuitry 34.

The isolated high voltage DC/DC circuit 24 includes a first switching bridge 36, a transformer 38, and a second switching bridge 40. The first switching bridge 36 is directly connected with the power converter circuitry 34. The transformer 38 is connected between the first and second switching bridges 36, 40.

The isolated high voltage to low voltage DC/DC circuit 28 includes an electromagnetic interference filter 42, a capacitor 44, and high voltage to low voltage power converter circuitry 46. The electromagnetic interference filter 42 is connected across the capacitor 44 and directly connected to the traction battery 16. The capacitor 44 is connected between the link capacitor 26 and high voltage to low voltage power converter circuitry 46. The high voltage to low voltage power converter circuitry 46 is directly connected to the auxiliary battery 18.

The onboard charge controller 20 is in communication with and/or exerts control over the components illustrated in FIG. 1.

Referring to FIG. 2, the system 12 includes an electric machine 48, an ISC 50, and a traction battery 52. The ISC 50 is connected between the electric machine 48 and traction battery 52.

The ISC 50 has a three-phase inverter designed to drive the electric machine 48 and operates at much higher power than the BCCM 14. The BCCM 14 also has three circuits configured as a three-phase inverter/rectifier. Two disconnect circuits are required to utilize the ISC's three-phase inverter in charging/discharging the traction battery 16. The first disconnect circuit is used to disconnect the electric motor 48 from the ISC 50, and the second disconnect is used to disconnect the ISC 50 from the traction battery 52. The contactors used in these disconnect circuits must carry the ISC's full current. Adding these contactors increases bill of material counts-making electric level integration unfavorable. Package level integration, however, can provide advantages since it reduces the overall package size and/or weight, and the number of connectors and wires. Package-level integration of a high voltage/low voltage DC/DC converter and AC/DC charger, for example, can increase a system's power density. It may create savings via shared coolant channels and through the elimination of connectors.

Figure 3:
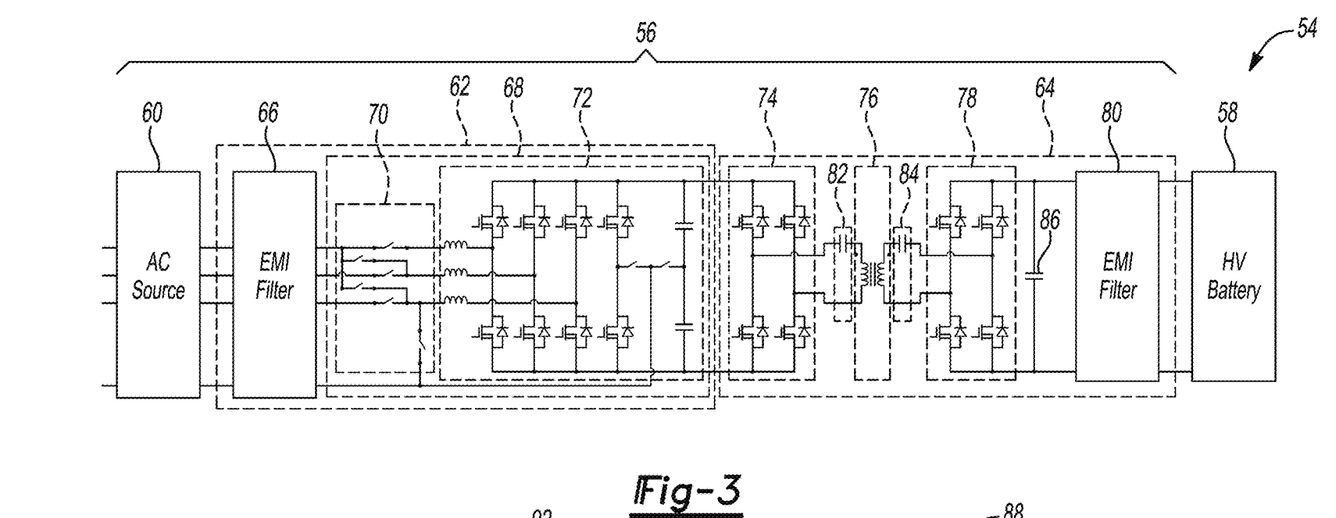
FIG. 3 is a schematic diagram of an isolated AC/DC onboard charger.

Referring to FIG. 3, an automotive system 54 includes an isolated AC/DC onboard charger 56 and a traction battery 58. In this example, the isolated AC/DC onboard charger 56 is connected between the traction battery 58 and an AC source 60.

The isolated AC/DC onboard charger 56 includes an AC/DC power factor correction circuit 62 (single phase/three phase) and an isolated high voltage DC/DC converter 64. The isolated high voltage DC/DC converter 64 is connected between the traction battery 58 and AC/DC power factor correction circuit 62.

The AC/DC power factor correction circuit 62 includes an electromagnetic interference filter 66 and a bidirectional totem pole power factor correction circuit 68. The bidirectional totem pole power factor correction circuit 68 includes a switch bank 70 and AC/DC power converter circuitry 72.

The switch bank 70 is connected between the electromagnetic interference filter 66 and AC/DC power converter circuitry 72.

The isolated high voltage DC/DC converter 64 includes a first switch bridge 74, a transformer 76, a second switching bridge 78, an electromagnetic interference filter 80, a pair of capacitors 82, 84, and a link capacitor 86. The transformer 76 is connected between the capacitors 82, 84, which are collectively connected between the first and second switching bridges 74, 78. The first switch bridge 74 is connected between the AC/DC power factor correction circuit 62 and capacitor 82. The second switching bridge 78 is connected between the capacitor 84 and link capacitor 86. The electromagnetic interference filter 80 is connected between the link capacitor 86 and traction battery 58.

Power from the AC source 60 can thus flow through the isolated AC/DC onboard charger 56 to charge the traction battery 58 during operation.

Figure 4:
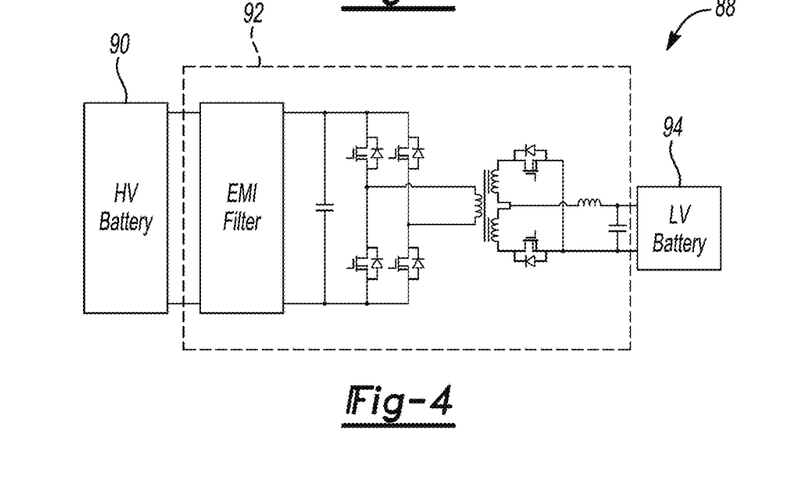
FIG. 4 is a schematic diagram of an isolated high voltage/low voltage DC/DC converter.

Referring to FIG. 4, an automotive system 88 includes a traction battery 90, an isolated high voltage/low voltage DC/DC converter 92, and a low voltage battery 94. Power can thus flow between the traction and low voltage batteries 90, 94 during operation.

It can be shown that the high voltage circuit consumes almost half of the overall footprint. Here, new circuit topologies are proposed that eliminate the high voltage circuit and reduce the space allocated to the high voltage to low voltage DC/DC converter's board by integrating the high voltage/low voltage DC/DC converter. The topologies may control the power flow between the high voltage DC/DC converter and the high voltage to low voltage DC/DC converter, overcome the high current circulation in the three-port transformer, and permit control for the low voltage circuit to be completely decoupled from the high voltage DC/DC controller.

The high voltage DC/DC switching frequency does not dictate the switching frequency of the low voltage circuit. For example, the low voltage circuit can be designed using gallium nitride high electron mobility transistors, while the high voltage DC/DC circuit can be designed using silicon carbide metal-oxide-semiconductor field-effect transistors. Such implementations allow the low voltage circuit to switch at a much higher frequency than the high voltage DC/DC circuit and thus increases its power density. The system does not require integrating the resonant inductor with the transformer to realize optimal transformer implementation. And without growing the low voltage circuit, the proposed topologies allow for eliminating the high voltage circuit, which may include a transformer, a primary H-bridge, gate drivers, and resonant inductors.

The onboard charger circuit can be modified such that an add-on circuit is used to output two isolated low-voltage levels. A single transformer isolates the high voltage AC domain, high voltage DC domain, and low voltage DC domain. The first low voltage output can be referred to as LV bus #1, and the second as LV bus #2.

The add-on circuit may include a coil magnetically coupled to the onboard charger's transformer, an unloaded rectifier, two coupled or uncoupled filter inductors, a filter capacitor for filtering the voltage after the inductors and providing DC output to LV bus #2, and a non-isolated DC/DC converter for stepping down or stepping up the input voltage from LV bus #2 and providing a constant DC voltage to LV bus #1.

The topology for the isolated high voltage DC/DC converter, which is part of the onboard charger, can be an LLC, LCC, CLLC, DAB, etc.

The high voltage DC/DC converter may include the following: i) a switching bridge referenced to the high voltage AC domain and a switching bridge referenced to the high voltage DC domain; ii) a transformer with a primary winding referenced to the high voltage AC domain and a secondary winding referenced to a high voltage DC domain; iii) an optional impedance matching network of inductors and/or capacitors to match the impedance and minimize reactive power in the transformer; the impedance matching network can also tune the impedance seen by the inverter/rectifier bridges to realize soft switching (i.e., zero voltage switching or zero current switching); iv) a third coil magnetically coupled to the secondary winding of the transformer and/or its primary winding such that the voltage induced across the third coil is dependent on the voltage across the secondary winding; v) an unloaded rectifier used to rectify the voltage across the third winding to provide a constant DC voltage ($V_A$) across a capacitor; under steady-state conditions, the unloaded rectifier may consume approximately 0 A, and thus the rectifier only needs to be rated to handle transient currents; power consumed by the unloaded rectifier consists of pure losses in its components; vi) two inductors and a capacitor forming a low-pass filter; two coupled or uncoupled inductors may be connected to the third coil terminals, and their other terminal may be tied together and connected to a capacitor referenced to low voltage ground; the voltage across the capacitor ($V_B$) is approximately half the voltage at the uncontrolled rectifier output ($V_A$); the voltage $V_B$ is the source voltage to LV bus #2; this voltage is expected to have a range that depends on the high voltage traction battery's state of charge (e.g., the voltage supplied to LV bus #2 can have a nominal value of 48V and a range between 36V and 52V depending on the high voltage traction battery's state of charge; vii) a non-isolated DC/DC converter accepting the voltage $V_B$ as input and stepping it up or down to provide a controlled voltage $V_C$; $V_C$ serves as the supply voltage to LV bus #1; in the case in which a low voltage battery is connected to LV bus #1, the non-isolated DC/DC converter is operated in current mode control or voltage mode control, depending on the low voltage battery's state of charge; the non-isolated DC/DC converter charges the LV battery and provides power to loads connected across LV bus #1.

Bi-directional power between the AC source and high voltage battery is controlled by controlling the high voltage DC/DC switching frequency, controlling the phase shift between the primary bridge and secondary bridge, and controlling the phase shift between the primary bridge's legs.

Figure 5:
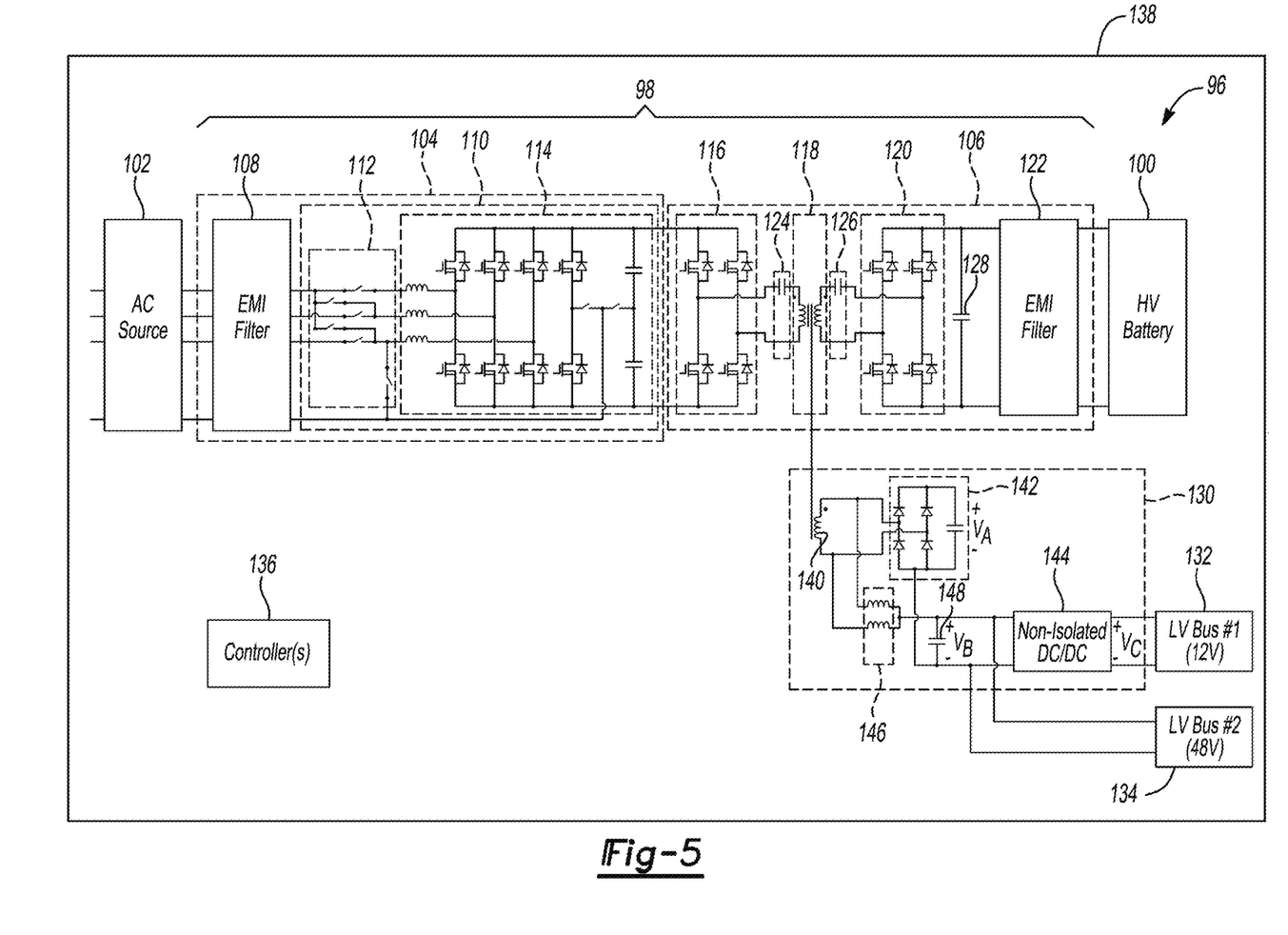
FIG. 5 is a schematic diagram of a circuit topology for integrating an auxiliary high voltage/low voltage DC/DC converter with an onboard charger.

Referring to FIG. 5, an automotive system 96 includes an isolated AC/DC onboard charger 98 and a traction battery 100. In this example, the isolated AC/DC onboard charger 98 is connected between the traction battery 100 and an AC source 102.

The isolated AC/DC onboard charger 98 includes an AC/DC power factor correction circuit 104 (single phase/three phase) and an isolated high voltage DC/DC converter 106. The isolated high voltage DC/DC converter 106 is connected between the traction battery 100 and AC/DC power factor correction circuit 104.

The AC/DC power factor correction circuit 104 includes an electromagnetic interference filter 108 and a bidirectional totem pole power factor correction circuit 110. The bidirectional totem pole power factor correction circuit 110 includes a switch bank 112 and AC/DC power converter circuitry 114. The switch bank 112 is connected between the electromagnetic interference filter 108 and AC/DC power converter circuitry 114.

The isolated high voltage DC/DC converter 106 includes a first switch bridge 116, a transformer 118, a second switching bridge 120, an electromagnetic interference filter 122, a pair of capacitors 124, 126, and a link capacitor 128. The transformer 118 is connected between the capacitors 124, 126, which are collectively connected between the first and second switching bridges 116, 120. The capacitors 124, 126 form an impedance matching network that matches the impedance of the transformer 118. The first switch bridge 116 is connected between the AC/DC power factor correction circuit 104 and capacitor 124. The second switching bridge 120 is connected between the capacitor 126 and link capacitor 128. The electromagnetic interference filter 122 is connected between the link capacitor 128 and traction battery 100.

Power from the AC source 102 can thus flow through the isolated AC/DC onboard charger 98 to charge the traction battery 100 during operation.

The automotive system 96 also includes additional circuitry 130, low voltage busses 132, 134, and one or more controllers 136. The one or more controllers 136 are in communication with and/or exert control over the components of FIG. 5. The automotive system is shown within the context of vehicle 138.

The additional circuitry 130 includes a coil 140, an unloaded rectifier 142, a non-isolated DC/DC converter 144, a pair of inductors 146, and a capacitor 148. The coil 140 is magnetically coupled to the transformer 118. The unloaded rectifier 142 is connected between the coil 140 and non-isolated DC/DC converter 144. The inductors 146, which may be coupled or uncoupled, are connected between the coil 140 and the non-isolated DC/DC converter 144. The capacitor 140 is connected between the unloaded rectifier 142/inductors 146 and non-isolated DC/DC converter 144 such that it can filter voltage after the inductors 146. The inductors 146 and capacitor 148 thus form a low pass filter.

The low voltage bus 132 is directly connected with the non-isolated DC/DC converter 144. The low voltage bus 134 is connected between the non-isolated DC/DC converter 144 and capacitor 148. The voltages on the low voltage busses 132, 134 can thus be different.

To achieve certain power requirements, the high voltage/low voltage DC/DC converter should guarantee operation under a single-point issue. For this reason, certain high voltage/low voltage DC/DC converters have two power circuits connected in parallel. The total power delivered to the low voltage load is thus split between two circuits. If one component has an issue in one power stage, the circuit is designed to shut down this stage while keeping the other power stage operational. Although the total output power is cut by half, certain loads will not lose power under this condition.

While the proposed magnetic level integration of FIG. 5 may have several advantages, presence of an issue in one component can shut down power delivery to certain low voltage loads. For example, loss of winding insulation can result in a short circuit across the winding. To address this issue, a new circuit topology and transformer structure may be needed to enable uninterrupted power transfer to certain low voltage loads under a single-point issue.

The proposed circuit topology integrates the high voltage/low voltage DC/DC with the onboard charger's high voltage DC/DC converter. This circuit can be built around a 5-winding transformer structure.

Figure 6:
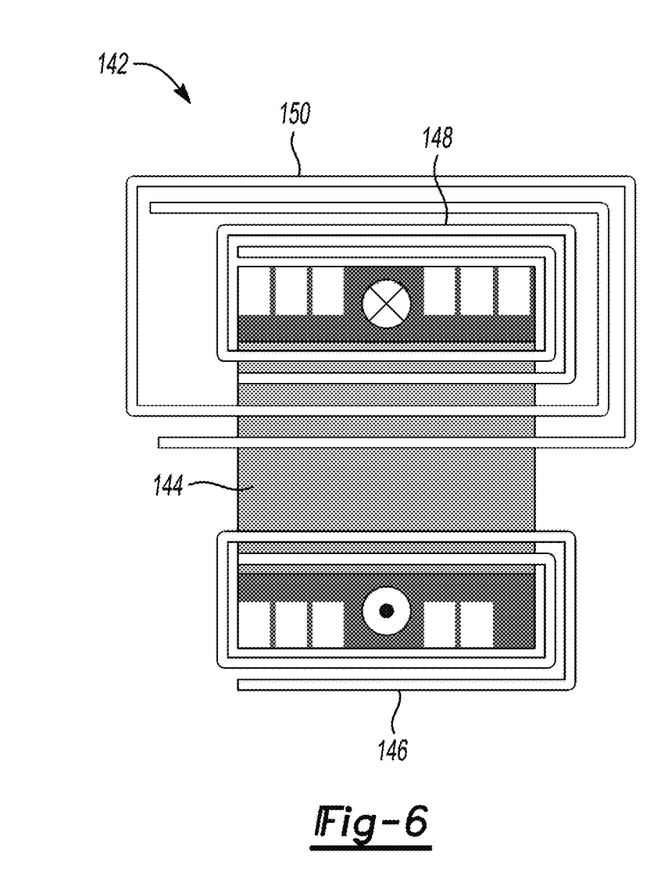
FIG. 6 is a cross-sectional view of a 3-winding transformer structure with a shared flux path.

Referring to FIG. 6, a transformer structure 142 includes a core 144 and windings 146, 148, 150. The windings 146, 148, 150 are wound around the core 144 as shown.

Figure 7:
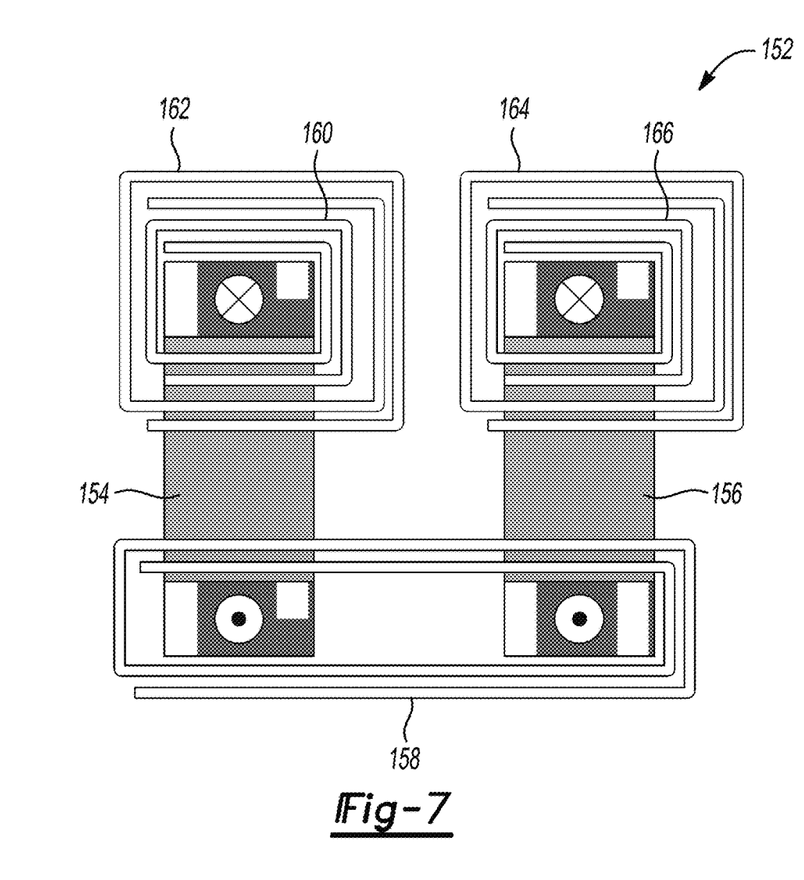
FIG. 7 is a cross-sectional view of a proposed 5-winding matrix transformer structure with two decoupled flux paths.

Referring to FIG. 7, a transformer structure 152 includes cores 154, 156 and windings 158, 160, 162, 164, 166. The winding 158 is wound around the cores 154, 156. The windings 160, 162 are wound around the core 154 and strongly coupled to the winding 158. The windings 164, 166 are wound around the core 156 and strongly coupled to the winding 158. The winding 160, 162 are strongly coupled, the windings 164, 166 are strongly coupled, and the windings 160, 162 are decoupled from the windings 164, 166. In this arrangement, $k_{23}=k_{25}=k_{43}=k_{45}=0$. Interleaving between the windings 158, 160, 162, 164, 166 can be implemented to minimize the proximity losses in the windings 158, 160, 162, 164, 166 and increase efficiency.

An isolated high voltage DC/DC converter in an onboard charger can be thus modified to realize two decoupled high voltage/low voltage DC/DC converters. The capacitor of the isolated high voltage DC/DC converter is replaced with two capacitors. A 5-winding transformer, such as the transformer 152, magnetically couples energy between the high voltage AC, high voltage DC, and low voltage DC power domains. Two multi-level buck converters are used to step down the rectified voltage produced by the windings 162, 166.

When the vehicle is connected to the AC grid, the isolated high voltage DC/DC converter operates as a typical CLLC circuit. The high voltage DC side bridge functions as a synchronous active rectifier. The current in the winding 160 equals the current in the winding 164, and no current flows through the transformer's center tap point. Current through the two capacitors of the isolated high voltage DC/DC converter is equal.

During drive mode, the single/three-phase bidirectional totem pole power factor correction circuit may be disabled, and the primary bridge part of the isolated high voltage DC/DC converter is not loaded. Two half-bridge DC/DC converters may be formed using the high voltage DC/DC secondary circuit. The first half-bridge DC-DC has the primary winding 160 strongly coupled to the windings 158, 162. Current in the winding 160 induces voltage across the windings 158, 162.

Since the high voltage DC/DC primary bridge is not loaded, no current flows through the winding 158 if ideal circuit is assumed. A small current may follow in the winding 158 to hold the DC-link capacitor voltage at its open circuit voltage level and overcome losses. Voltage appearing across the winding 162 is rectified and delivered to a multi-level buck converter. A multi-level buck converter (e.g., three levels minimum) may be used to step down the voltage across a capacitor of the isolated high voltage/low voltage DC/DC converter and provide a source to a low voltage bus. A multi-level buck ensures that an issue in one field effect transistor will result in an open circuit across its output.

The second half-bridge DC/DC converter has the primary winding 164 which is strongly coupled to the windings 158, 166. In a similar way, current in the winding 164 induces a voltage in the winding 166. Voltage appearing across the winding 166 can be rectified and then supplied to a second multi-level buck converter which steps down the voltage to source power to the LV bus.

Under normal operation, the two multi-level buck converters are paralleled/interleaved and share equally the current supplied to a low voltage battery. Two current sensors can be used to measure the input current delivered to the two half-bridge rectifiers. Peak current control strategies may limit the input current at each switching cycle.

During drive mode, the BCCM circuit is configured as two separate and decoupled high voltage/low voltage DC/DC converters. An issue in a component in one of the converters leads to shutting down of that converter while the other can still provide power.

Figure 8:
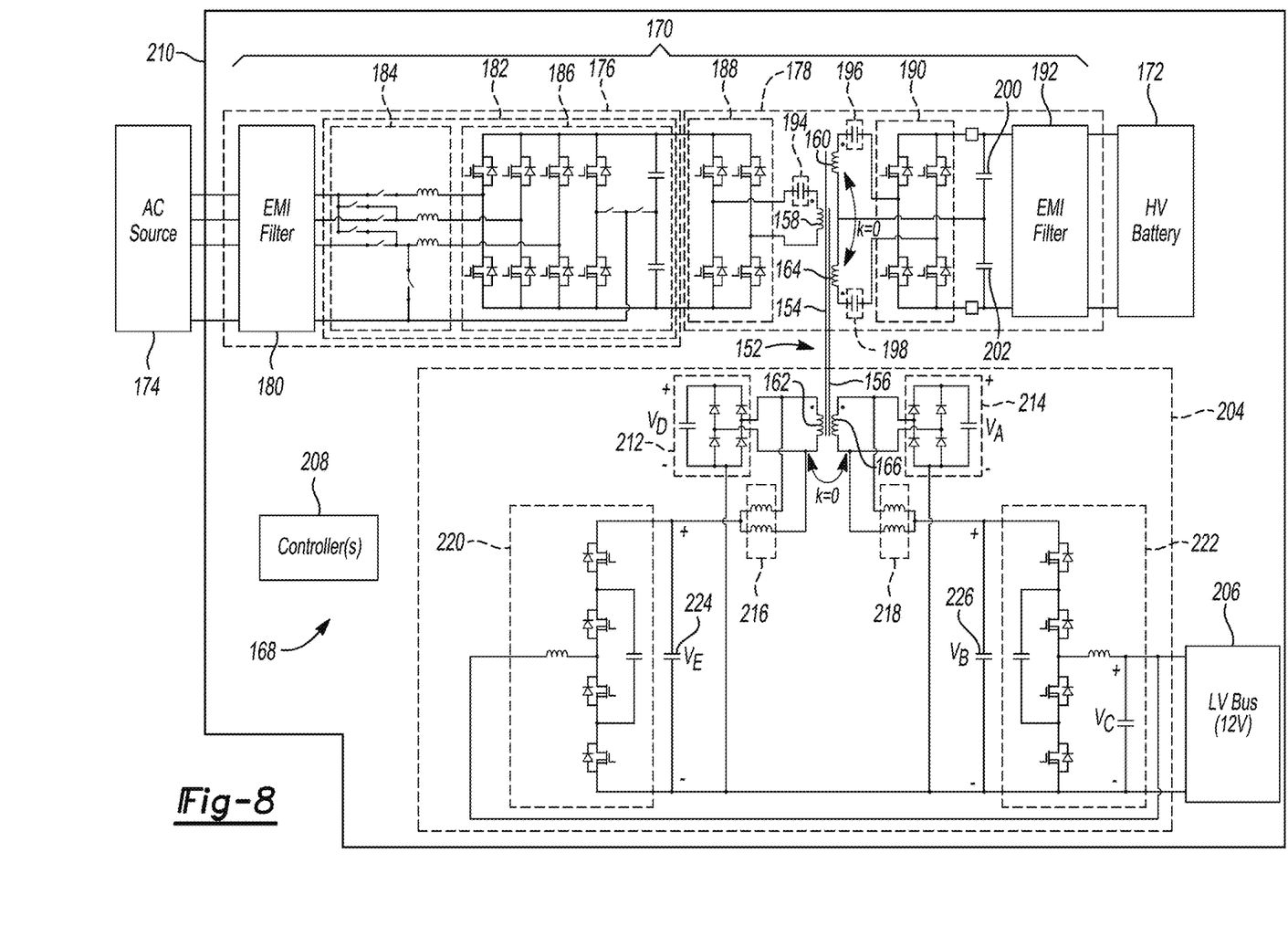
FIG. 8 is a schematic diagram of a magnetically integrated onboard charger/high voltage to low voltage DC/DC converter with windings for enabling uninterrupted low voltage supply while in drive mode.

Referring to FIG. 8, an automotive system 168 includes an isolated AC/DC onboard charger 170 and a traction battery 172. In this example, the isolated AC/DC onboard charger 170 is connected between the traction battery 172 and an AC source 174.

The isolated AC/DC onboard charger 170 includes an AC/DC power factor correction circuit 176 (single phase/three phase) and an isolated high voltage DC/DC converter 178. The isolated high voltage DC/DC converter 178 is connected between the traction battery 172 and AC/DC power factor correction circuit 186.

The AC/DC power factor correction circuit 176 includes an electromagnetic interference filter 180 and a bidirectional totem pole power factor correction circuit 182. The bidirectional totem pole power factor correction circuit 182 includes a switch bank 184 and AC/DC power converter circuitry 186. The switch bank 184 is connected between the electromagnetic interference filter 180 and AC/DC power converter circuitry 114.

The isolated high voltage DC/DC converter 178 includes a first switch bridge 188, some of the transformer 152, a second switching bridge 190, an electromagnetic interference filter 192, capacitors 194, 196, 198 and link capacitors 200, 202. The windings 158, 160, 164 is connected between the capacitors 194, 196/198, which are collectively connected between the first and second switching bridges 188, 190. The capacitors 194, 196, 198 form an impedance matching network that matches impedance associated with the transformer 152. The first switching bridge 188 is connected between the AC/DC power factor correction circuit 176 and capacitor 194. The second switching bridge 190 is connected between the capacitors 196, 198 and capacitors 200, 202. The electromagnetic interference filter 192 is connected between the capacitors 200, 202 and traction battery 172.

Power from the AC source 174 can thus flow through the isolated AC/DC onboard charger 170 to charge the traction battery 172 during operation.

The automotive system 168 also includes an isolated high voltage/low voltage DC/DC converter 204, low voltage bus 206, and one or more controllers 208. The one or more controllers 208 are in communication with and/or exert control over the components of FIG. 8. The automotive system 168 is shown within the context of vehicle 210.

The isolated high voltage/low voltage DC/DC converter 204 includes some of the transformer 152, unloaded rectifiers 212, 214, pairs of inductors 216, 218, multi-level buck converters 220, 222, and capacitors 224, 226. The unloaded rectifier 212 is connected across the winding 162. The unloaded rectifier 214 is connected across the winding 166. The pair of inductors 216 is connected across the winding 162. The pair of inductors 218 is connected across the inductor 166. The capacitor 224 is connected across the multi-level buck converter 220. The capacitor 226 is connected across the multi-level buck converter 222. The multi-level buck converters 220, 222 are connected with the low voltage bus 206.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
   a first isolated DC/DC converter arranged to directly exchange power with a traction battery;
   a second isolated DC/DC converter arranged to directly exchange power with a bus; and
   a matrix transformer structure, including five windings and two separate cores, shared between and magnetically coupling the first and second isolated DC/DC converters, wherein a first of the windings is wound around both of the cores, partially defines the first isolated DC/DC converter, and is electrically isolated from the traction battery.

2. The automotive power system of claim 1, wherein a second and third of the windings are each wound around a different one of the cores, partially define the first isolated DC/DC converter, and are electrically connected with the traction battery.

3. The automotive power system of claim 2, wherein a fourth of the windings is wound around a same one of the cores as the second of the windings, partially defines the second isolated DC/DC converter, and is magnetically coupled with the first and second of the windings such that current through the second of the windings induces voltages across the first and fourth of the windings.

4. The automotive power system of claim 2, wherein a fifth of the windings is wound around a same one of the cores as the third of the windings, partially defines the second isolated DC/DC converter, and is magnetically coupled with the first and third of the windings such that current through the third of the windings induces voltages across the first and fifth of the windings.

5. The automotive power system of claim 1, wherein the second isolated DC/DC converter includes a pair of multi-level buck converters.

6. The automotive power system of claim 5, wherein the second isolated DC/DC converter further includes a pair of unloaded rectifiers.

7. The automotive power system of claim 1 further comprising a bidirectional totem pole power factor correction circuit electrically connected with the first isolated DC/DC converter and isolated from the second isolated DC/DC converter.

8. The automotive power system of claim 1, wherein a voltage of the traction battery and a voltage of the bus are different.

9. A vehicle comprising:
a bidirectional totem pole power factor correction circuit;
a traction battery;
an isolated DC/DC converter connected between the bidirectional totem pole power factor correction circuit and traction battery such that power from an AC source feeding the bidirectional totem pole power factor correction circuit charges the traction battery;
a second isolated DC/DC converter; and
a matrix transformer structure, including five windings and two separate cores, shared between and magnetically coupling the first and second isolated DC/DC converters.

10. The vehicle of claim 9, wherein a first of the windings is wound around both of the cores, partially defines the first isolated DC/DC converter, and is electrically isolated from the traction battery.

11. The vehicle of claim 10, wherein a second and third of the windings are each wound around a different one of the cores, partially define the first isolated DC/DC converter, and are electrically connected with the traction battery.

12. The vehicle of claim 11, wherein a fourth of the windings is wound around a same one of the cores as the second of the windings, partially defines the second isolated DC/DC converter, and is magnetically coupled with the first and second of the windings such that current through the second of the windings induces voltages across the first and fourth of the windings.

13. The vehicle of claim 12, wherein a fifth of the windings is wound around a same one of the cores as the third of the windings, partially defines the second isolated DC/DC converter, and is magnetically coupled with the first and third of the windings such that current through the third of the windings induces voltages across the first and fifth of the windings.

14. The vehicle of claim 9, wherein the second isolated DC/DC converter includes a pair of multi-level buck converters.

15. The vehicle of claim 14, wherein the second isolated DC/DC converter further includes a pair of unloaded rectifiers.

16. An automotive power system comprising:
a matrix transformer structure, including five windings and two separate cores, shared between and magnetically coupling first and second isolated DC/DC converters, wherein a first of the windings is wound around both of the cores and partially defines the first isolated DC/DC converter, wherein a second and third of the windings are each wound around a different one of the cores and partially define the first isolated DC/DC converter, and wherein a fourth of the windings is wound around a same one of the cores as the second of the windings, partially defines the second isolated DC/DC converter, and is magnetically coupled with the first and second of the windings such that current through the second of the windings induces voltages across the first and fourth of the windings.

17. The automotive power system of claim 16, wherein a fifth of the windings is wound around a same one of the cores as the third of the windings, partially defines the second isolated DC/DC converter, and is magnetically coupled with the first and third of the windings such that current through the third of the windings induces voltages across the first and fifth of the windings.

\* \* \* \* \*